(12) United States Patent
Deng et al.

(10) Patent No.: US 6,276,742 B1
(45) Date of Patent: Aug. 21, 2001

(54) ROOF AND BODY MOUNTED APPARATUS FOR COVERING AUTOMOBILE WINDSHIELDS

(75) Inventors: David Deng, 2668 High Ridge Dr., Chino Hills, CA (US) 91709; Dai Lei, Rowland Heights, CA (US)

(73) Assignee: David Deng, Chino Hills, CA (US)

( * ) Notice: Subject to any disclaimer, the term of this patent is extended or adjusted under 35 U.S.C. 154(b) by 0 days.

(21) Appl. No.: 09/693,253

(22) Filed: Oct. 19, 2000

Related U.S. Application Data

(63) Continuation of application No. 09/261,266, filed on Mar. 3, 1999, which is a continuation-in-part of application No. 09/255,378, filed on Feb. 22, 1999, now Pat. No. 6,168,225.

(51) Int. Cl.[7] .......................................................... B60J 1/20
(52) U.S. Cl. .................... 296/95.1; 296/136; 160/DIG. 3; 160/370.21
(58) Field of Search .................................. 296/95.1, 136; 160/DIG. 3, DIG. 4, 370.21

(56) References Cited

U.S. PATENT DOCUMENTS

| | | |
|---|---|---|
| 1,999,171 | 4/1935 | Bryant . |
| 2,570,399 | 10/1951 | Smith . |
| 2,812,208 | 11/1957 | Francis . |
| 3,095,034 | 6/1963 | Francis . |
| 3,174,536 | 3/1965 | Francis . |
| 3,375,036 | 3/1968 | Francis . |
| 3,957,301 | 5/1976 | Huber . |
| 4,131,269 | 12/1978 | Brattrud . |
| 4,597,608 | 7/1986 | Duffy . |
| 4,848,827 | 7/1989 | Ou . |
| 4,929,016 | 5/1990 | Kastanis . |
| 5,186,511 | 2/1993 | Hwang . |
| 5,230,545 | 7/1993 | Huang et al. . |
| 5,244,246 | 9/1993 | Cunningham . |
| 5,433,499 | 7/1995 | Wu . |
| 5,516,181 | 5/1996 | Thompson . |
| 5,762,393 | 6/1998 | Darmas, Sr. . |
| 5,800,006 | 9/1998 | Pettigrew . |
| 6,012,759 | 1/2000 | Adamek . |
| 6,168,225 | 1/2001 | Deng et al. . |

*Primary Examiner*—Joseph D. Pape
*Assistant Examiner*—Kiran B. Patel
(74) *Attorney, Agent, or Firm*—Henricks, Slavin & Holmes LLP

(57) ABSTRACT

An apparatus for use with an automobile having a windshield includes a screen member and an actuator mechanism. The screen member is sized to substantially cover the windshield and to be stored within a housing defined by the automobile.

18 Claims, 14 Drawing Sheets

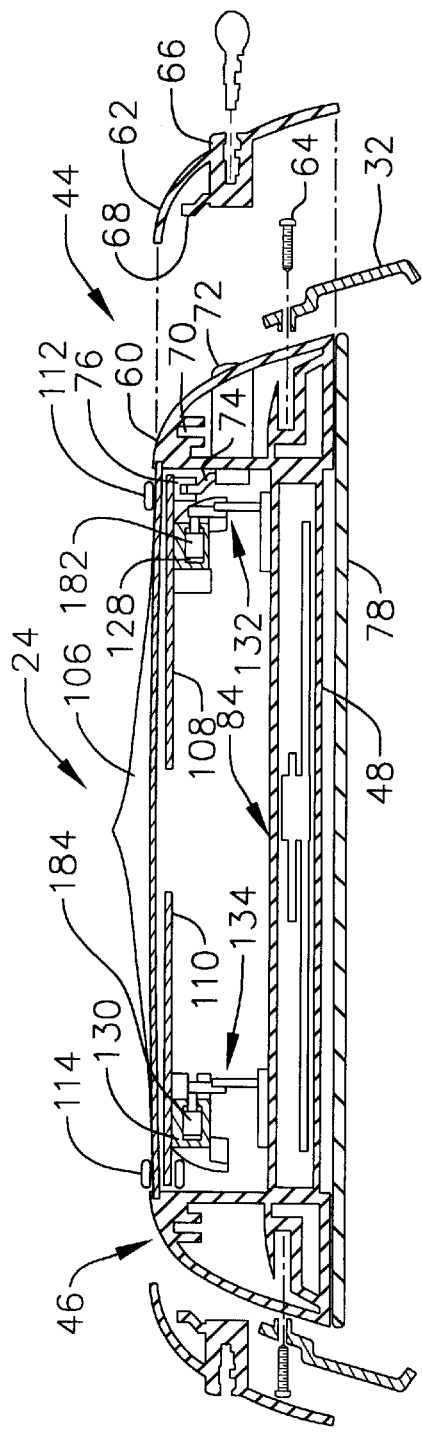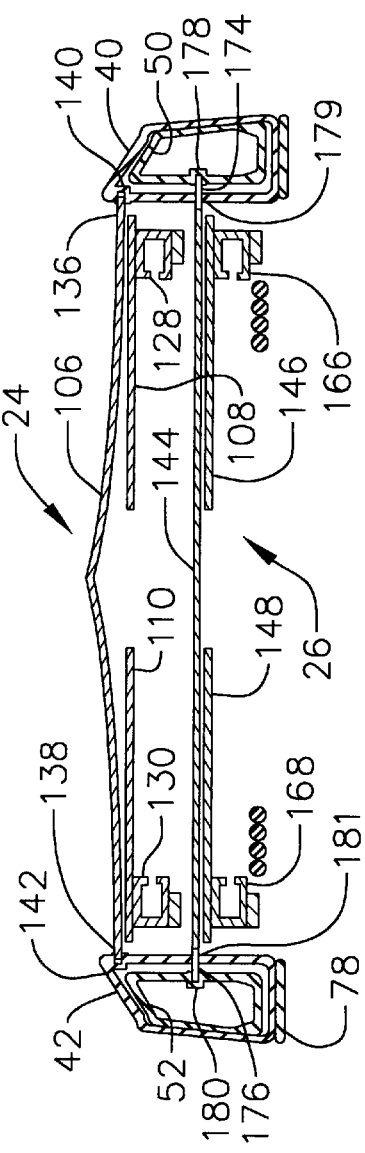

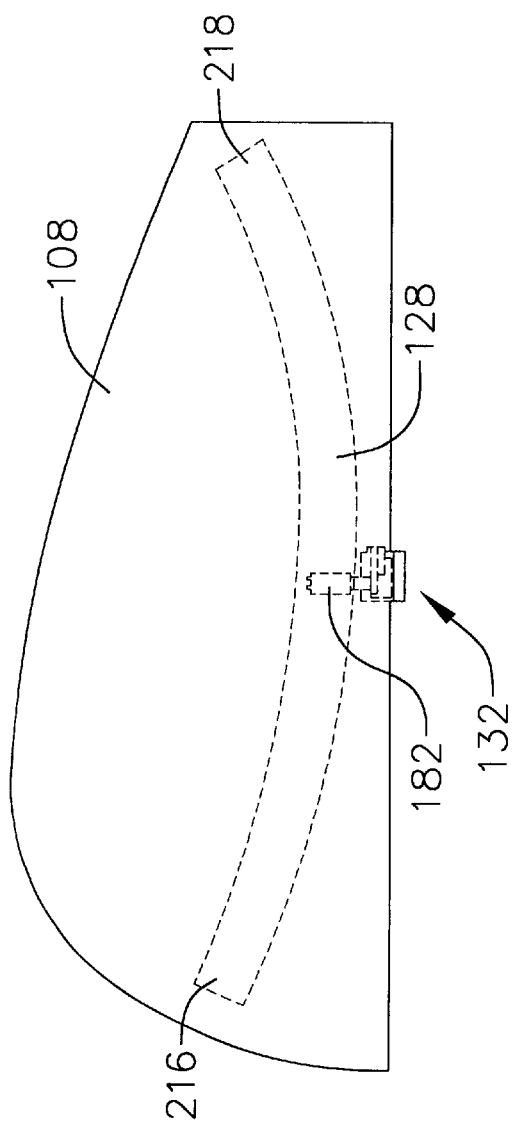
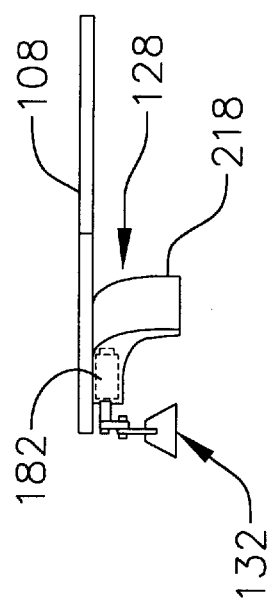
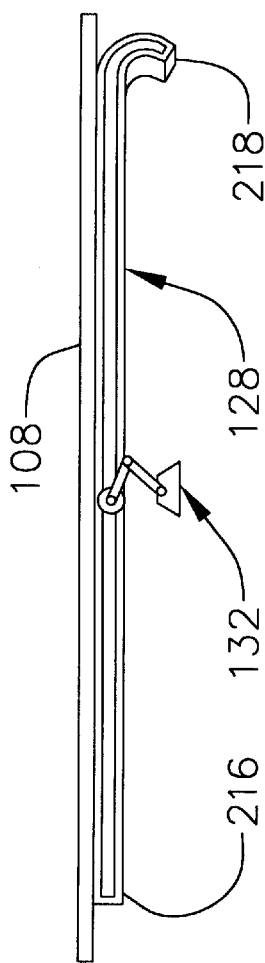

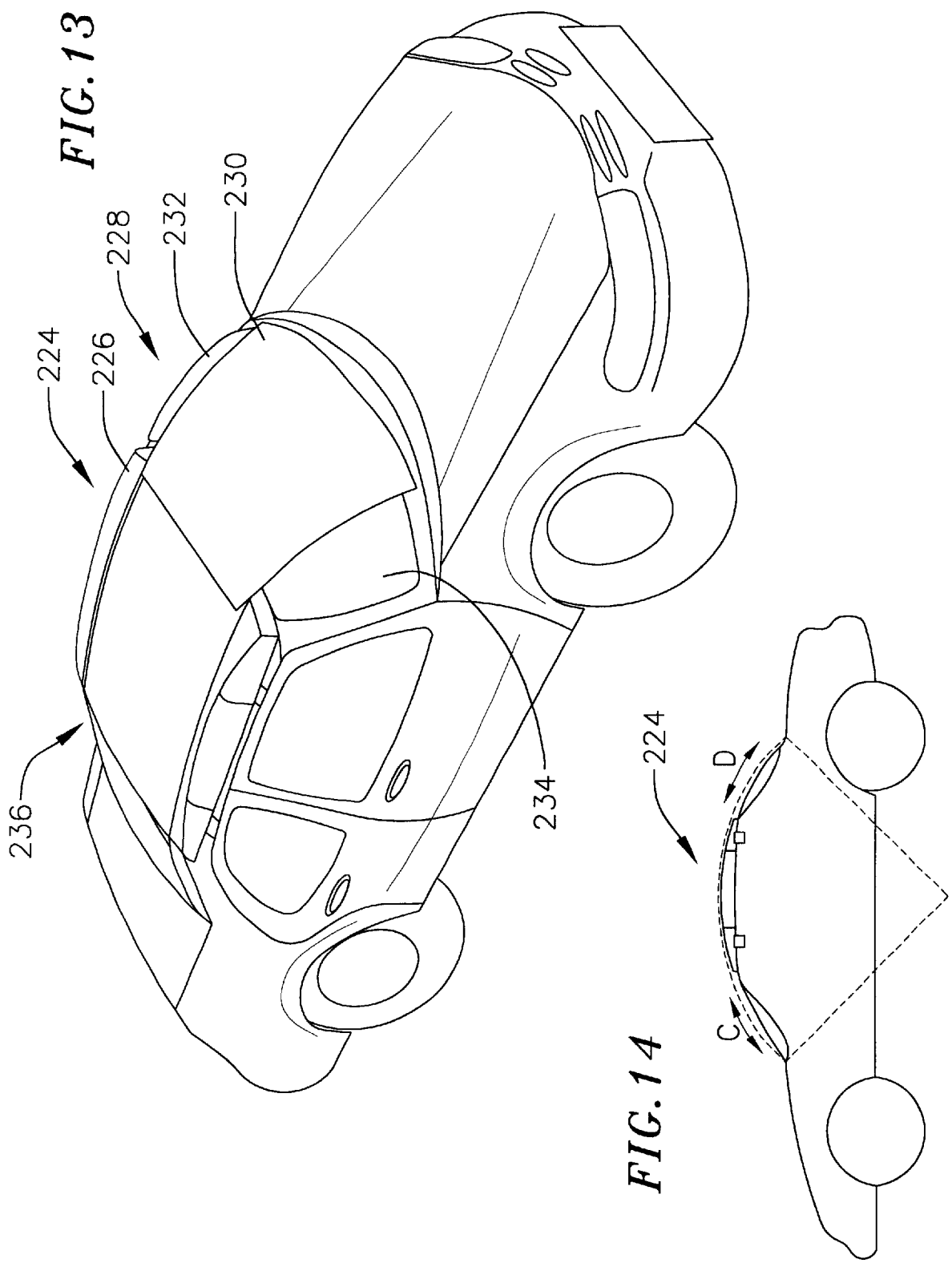

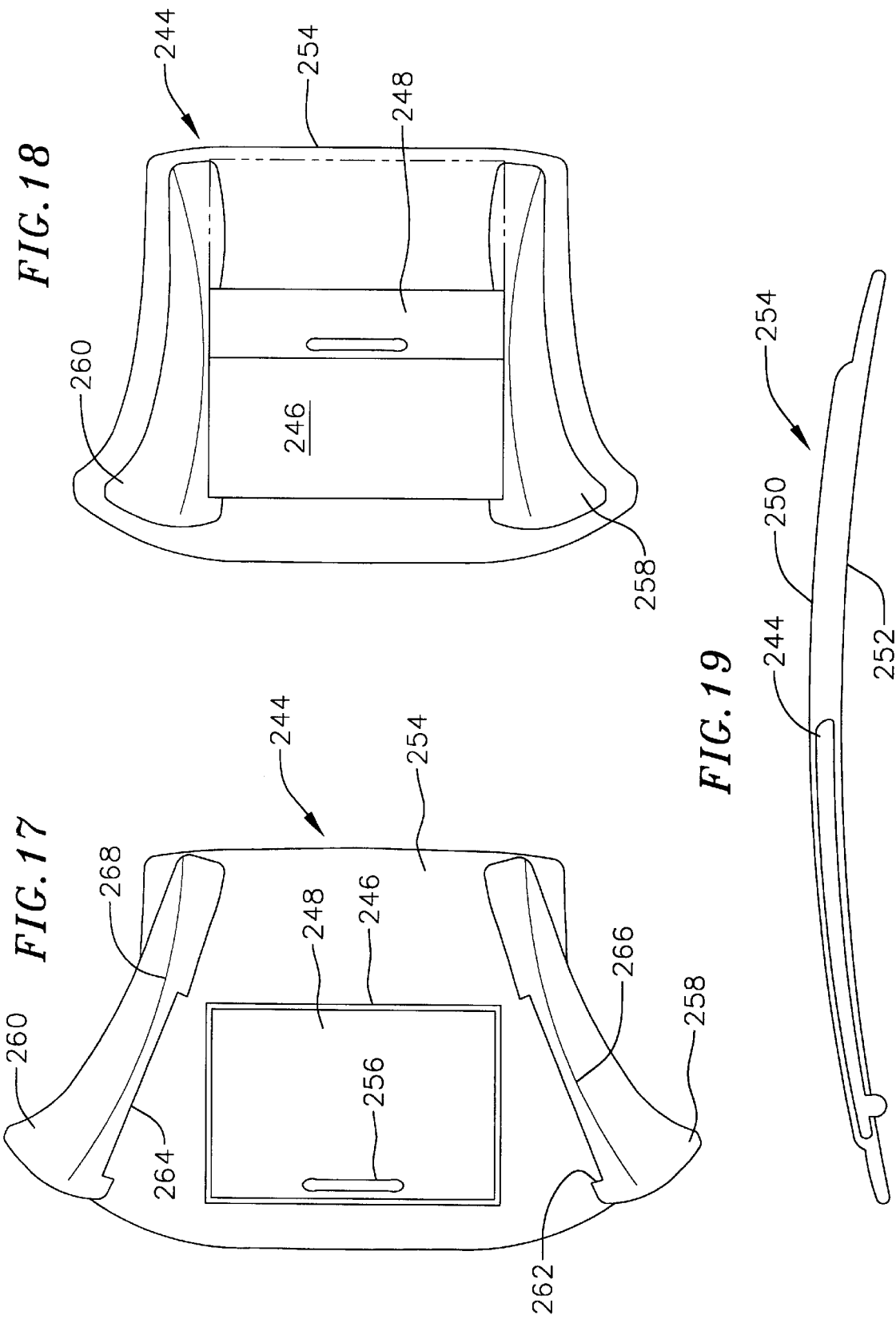

FIG.24

ROOF AND BODY MOUNTED APPARATUS FOR COVERING AUTOMOBILE WINDSHIELDS

CROSS-REFERENCE TO RELATED APPLICATIONS

This application is a continuation of U.S. application Ser. No. 09/261,266, filed Mar. 3, 1999, which is a continuation-in-part of U.S. application Ser. No. 09/255,378, filed Feb. 22, 1999, now U.S. Pat. No. 6,168,225, entitled "Apparatus For Covering Automobile Windshields," which is incorporated herein by reference.

BACKGROUND OF THE INVENTION

1. Field of Invention

The present invention relates generally to automobile accessories and, more particularly, to automobile windshield covers.

2. Description of the Related Art

Automobiles typically have front, rear and side windshields and these windshields can be the source of a number of problems. During the summer, when the sun beats down on automobiles for long periods of time, the windshields allow ultraviolet radiation to penetrate automobile interiors. As a result, the air temperature within automobiles will often rise to unbearable levels and devices such ;as the steering wheel can become too hot to touch. The ultraviolet radiation can also damage dashboards, upholstery, and items left within the automobile.

During the winter, frost, snow and ice must be cleared from the windshield prior to driving. Removing frost, snow and ice is a difficult and time consuming task which must be performed in cold conditions, often when the driver is in a hurry, such as in the morning when leaving home to go to work. This problem is compounded when the driver is unprepared and does not have an ice scraper or snow brush. Even moisture from mist and rain, which can build up on windshields while an automobile is parked and limit visibility, will create a safety hazard because windshield wipers do not remove the moisture from the side and rear windshields or those portions of the front windshield out of their reach.

Automobile covers, which are sheets of plastic or fabric material that cover an entire automobile, are one proposed solution to the aforementioned problems. Although useful, the inventor herein has determined that automobile covers are inconvenient because a significant amount of effort is required to place such covers over automobiles and remove them therefrom. Additionally, snow must be removed from the cover before the cover can be removed from the automobile.

The ubiquitous cardboard automobile shade, which can be positioned adjacent the inner surface of a windshield, is a prior attempt to prevent the deleterious effects of the summertime sun. The inventor herein has determined that such shades are inconvenient because once the driver enters the automobile, he or she must remove the relatively large shade from the windshield area, fold it and then find a place to store it. In those instances where there are other passengers in the automobile, the driver must exit the automobile and place the shade in the trunk.

SUMMARY OF THE INVENTION

The inventor herein has determined that a need exists for a better solution to the aforementioned problems. Accordingly, one object of the present invention is to provide a device that prevents ultraviolet radiation from penetrating automobile interiors through the windshields and also prevents frost, snow, ice, mist and rain from building up on windshields. Another object of the present invention is to provide a device which performs these functions in a manner that is more convenient than those devices introduced heretofore.

In order to accomplish some of these and other objectives, a device in accordance with a preferred embodiment of a present invention includes a housing adapted to be secured to an automobile roof and a canopy movable between a retracted position substantially aligned with the housing and an extended position substantially aligned with the windshield. An actuation device that is adapted to drive the canopy between the retracted and extended positions may be provided. Alternatively, or in addition, the device may be configured for manual deployment of the canopy. In certain preferred embodiments, the device includes two canopies—one for the front windshield and one for the rear windshield.

The present invention provides a more useful solution to the aforementioned problems than has been introduced heretofore. For example, the canopy can be easily deployed to the extended position, either manually or by way of an actuation device. So deployed, the canopy will prevent ultraviolet radiation from penetrating the automobile via the windshield. Thus, the present invention prevents the temperature within an automobile from rising to unbearable levels and also prevents damage dashboards, upholstery, and items left within the automobile in a manner that is more convenient for the driver than conventional automobile shades.

The deployed canopy will also conveniently prevent frost, snow, ice, mist and rain from building up on the windshield. When the driver approaches the automobile, the canopy can be manually retracted or, if included, an actuation device can be used to retract the canopy, thereby exposing a windshield that is free of frost, snow, ice, mist and rain. As such, drivers can avoid the difficult and time consuming task of clearing frost, snow, ice, mist and rain from the windshield.

The preferred embodiment may also include a mechanism for preventing movement of the deployed canopy, thereby locking it in the deployed position. As prospective automobile thieves will be less likely to attempt to steal an automobile with an obstructed windshield, the present invention provides a useful theft deterrent.

In other preferred embodiments, the device also includes side canopies that cover the side windshields. Such side canopies provide additional protection and convenience. Moreover, an embodiment of the present invention that includes front, rear and side canopies will also reduce the likelihood that thieves will break into the car because, absent the present canopies, thieves will be able to spot valuable items that have been left within a parked automobile by simply looking through one of the windshields.

In order to accomplish some of these and other objectives, a device for covering automobile windshields in accordance with a preferred embodiment of a present invention includes a screen housed within a portion of the automobile body, such as a door for example, and is extendable therefrom to cover a windshield, such as a side windshield for example. More specifically, the exemplary device includes a screen member sized to substantially cover a windshield and to be fitted within a housing defined by the automobile and an actuator positioned within the housing. The actuator is operably connected to the screen member and adapted to extend the screen member from the housing over at least a portion of the windshield and to retract the screen member into the housing.

In order to accomplish some of these and other objectives, an automobile in accordance with a preferred embodiment of the present invention includes a housing adapted to be secured to an automobile roof and canopies movable between retracted positions substantially aligned with the housing and extended positions substantially aligned with the front and rear windshields and also includes screens housed within side portions of the automobile body, such as the doors, that are extendable therefrom to cover the side windshields.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

FIG. 5 is a section view taken along lines 5—5 in FIG. 4.

FIG. 6 is a section view taken along lines 6—6 in FIG. 4.

FIG. 8 is a top view of a canopy side member, track and fixed follower arrangement in accordance with a preferred embodiment of the present invention.

FIG. 9 is a side view of the canopy side member, track and fixed follower arrangement illustrated in FIG. 8.

FIG. 10 is an end view of the canopy side member, track and fixed follower arrangement illustrated in FIG. 8.

FIG. 13 is a perspective view of an automobile and an apparatus for covering automobile windshields in accordance with another preferred embodiment of the present invention in a deployed state.

FIG. 14 is a side view of the automobile and windshield covering apparatus illustrated in FIG. 13.

FIG. 17 is a bottom view of a canopy for use with an automobile having a sunroof in a deployed state.

FIG. 18 is a bottom view of the canopy illustrated in FIG. 17 in a retracted state.

FIG. 19 is a side, section view of the main canopy member illustrated in FIG. 17.

FIG. 24 is a cross-sectional side view of the automobile door and apparatus illustrated in FIG. 23.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention. Also, as used herein the term "automobile" is intended to cover common passenger automobiles as well as trucks and other motorized wheeled vehicles.

Figure 1:
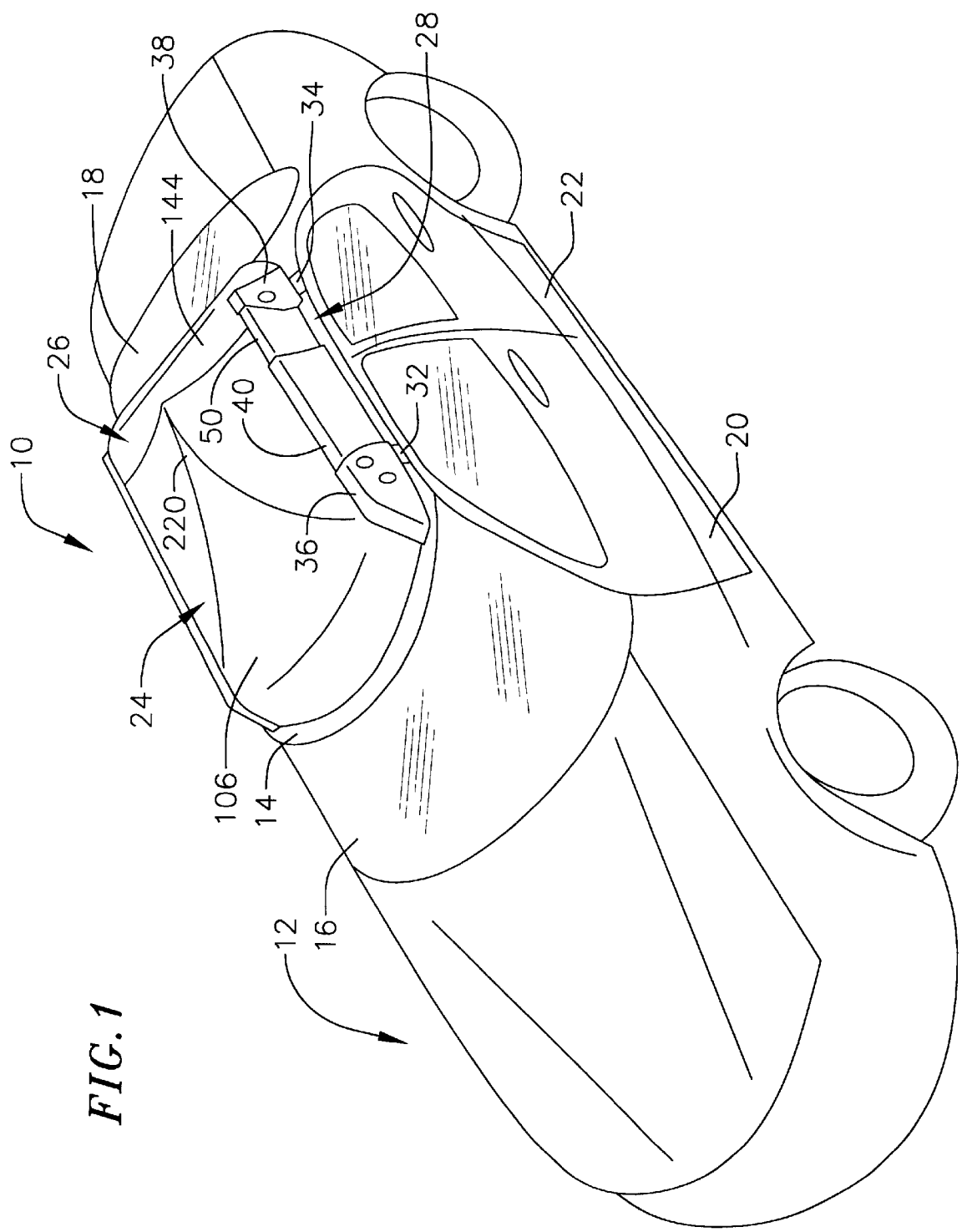
FIG. 1 is a perspective view of an automobile and an apparatus for covering automobile windshields in accordance with a preferred embodiment of the present invention in a retracted state.
Figure 2:
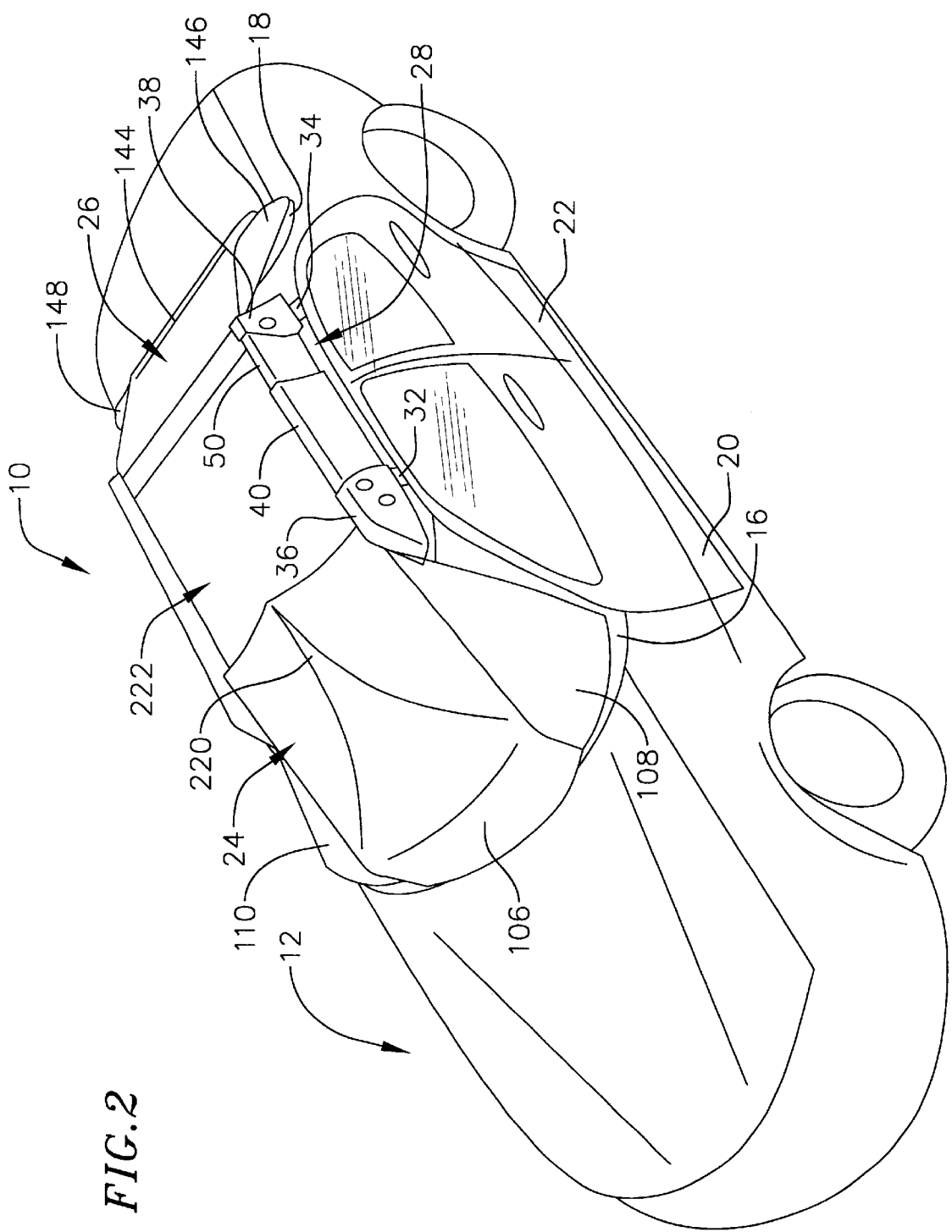
FIG. 2 is a perspective view of the apparatus for covering automobile windshields illustrated in FIG. 1 in a deployed state.

As illustrated for example in FIGS. 1 and 2, an apparatus 10 for covering automobile windshields in accordance with a preferred embodiment of the present invention may be mounted on an automobile 12. Specifically, the exemplary windshield covering apparatus 10 may be mounted on the roof 14 of the automobile 12, which itself includes a front windshield 16, a rear windshield 18, a front side door 20 with a side windshield, and a rear side door 22 with another side windshield. The apparatus may include one or more canopies that will respectively cover one or more of the windshields when deployed. In the illustrated embodiment, the windshield covering apparatus 10 includes a front canopy 24 that may be used to cover the front windshield 16 and a rear canopy 26 that may be used to cover the rear windshield 18. The canopies 24 and 26 are movable between the retracted positions illustrated in FIG. 1, which are the driving positions, and the deployed positions illustrated in FIG. 2, which are the parked positions. So deployed, the canopies 24 and 26 will prevent damage from ultraviolet radiation that would otherwise pass through the front and rear windshields and also prevent frost, snow, ice, mist and rain from building up on the front and rear windshields.

Figure 3:
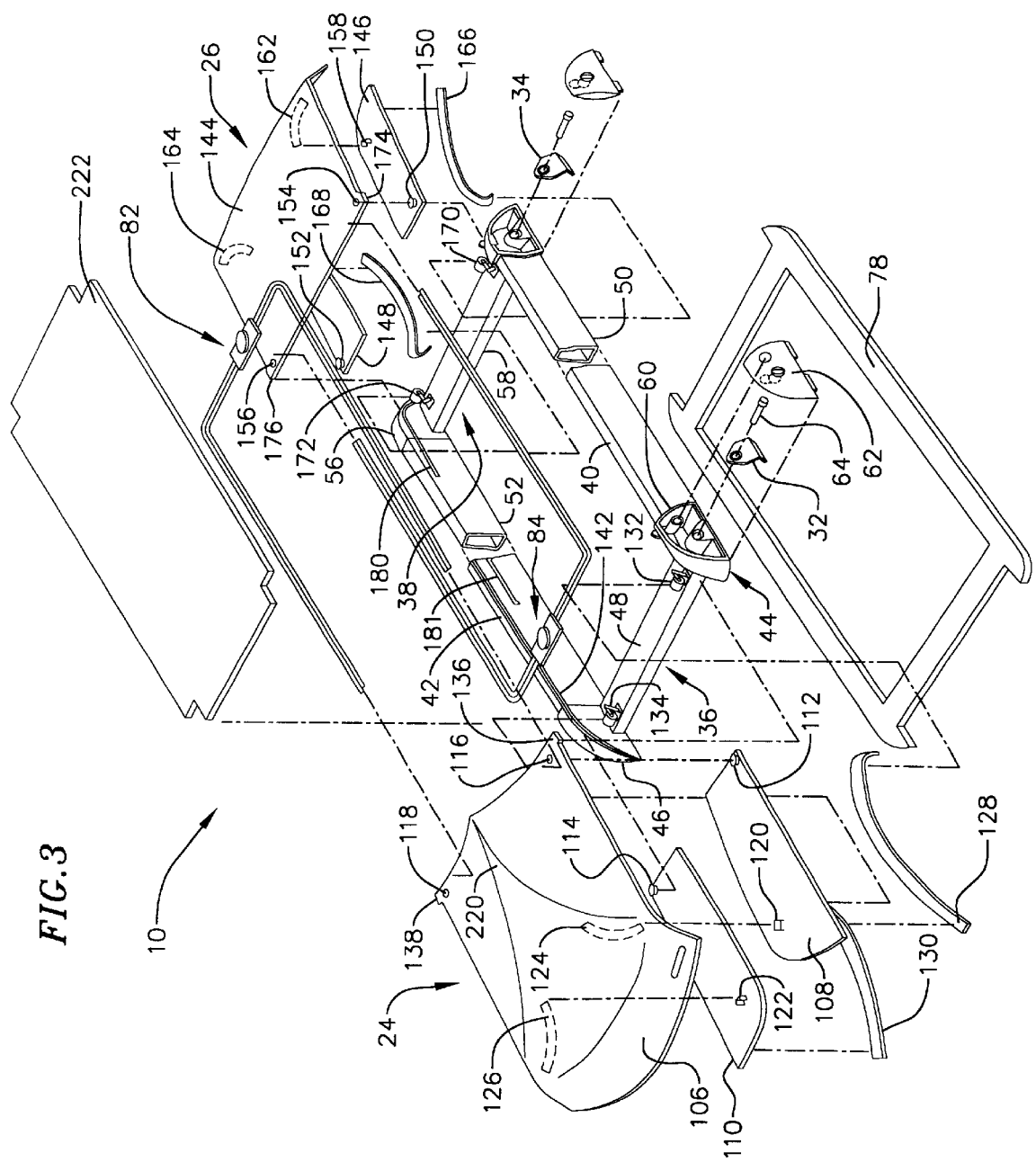
FIG. 3 is an exploded view of the apparatus for covering automobile windshields illustrated in FIG. 1.
Figure 4:
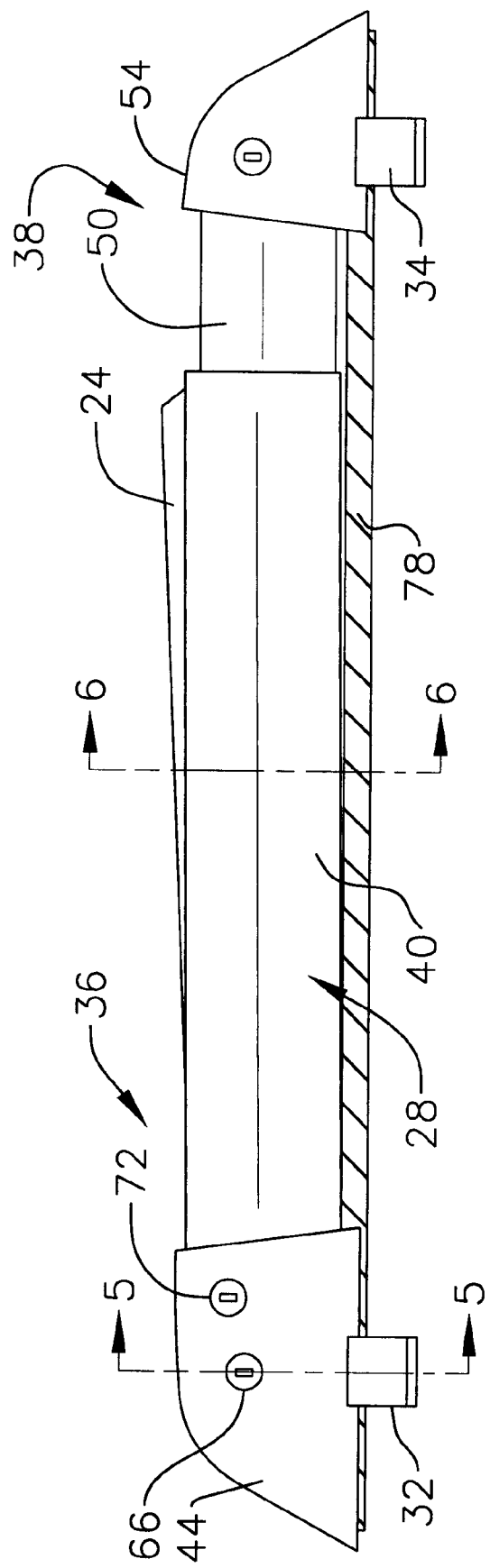
FIG. 4 is a side view of the apparatus for covering automobile windshields illustrated in FIG. 1.

Referring to FIGS. 1–3, the exemplary windshield covering apparatus 10 includes a housing 28 which is secured to the automobile roof 14 by way of door clamps 32 and 34 (in addition to two other door clamps that are not visible in FIGS. 4–6) in a manner similar to conventional luggage racks. The clamps 32 and 34, which are adapted to extend beyond the edge of the doors 20 and 22 and fit between the weather strip and automobile frame, are preferably coated with a non-slip material such as rubber or latex. Referring to FIGS. 3–6, the exemplary housing 28 consists of a front housing member 36 and a rear housing member 38 which are movable relative to one another to adjust for variations in roof configurations from automobile to automobile. The exemplary front housing member 36 includes rails 40 and 42, lock housings 44 and 46, and a cross bar 48. Similarly, the rear housing member 38 includes rails 50 and 52, lock housings 54 and 56, and a cross; bar 58. The rails 40, 42, 50, 52 are preferably hollow tubular members. The rails 50 and 52 are respectively slidably received within the rails 40 and 42, thereby allowing the front and rear housing members 36 and 38 to be moved relative to one another.

As illustrated for example in FIG. 5, the lock housing 44 includes a main housing portion 60 and a cover 62. During installation of the exemplary apparatus 10, the clamp 32 may be secured to main housing portion 60 with a threaded fastener 64. Access to the threaded fastener 64 is limited by a lock 66 on the cover 62. The lock 66 includes an arm 68 that mates with a slot 70 in the main housing portion 60. There is a total of four lock housings in the preferred embodiment, and each lock housing includes these structural elements. In addition to the common elements, the lock housing 44 also includes a canopy lock 72 that prevents the front canopy 24 from being deployed inadvertently while driving. The canopy lock 72 also prevents the canopy from being manually deployed or retracted against the wishes of the owner of the automobile. In that regard, the present invention provides an important theft deterrent because a thief is less likely to steal an automobile where the front windshield is obstructed. The canopy lock 72 includes an arm 74 that mates with one of two receivers 76 on the underside of the front canopy 24. The receivers 76 are respectively located such that one will be aligned with the canopy lock arm 74 when the front canopy 24 is fully retracted and the other will be aligned with canopy lock arm when the front canopy is fully deployed. It should also be rioted that a similar canopy lock may be provided for the rear canopy 26.

A resilient pad 78 may be provided between the apparatus housing 28 and the automobile roof 14. The resilient pad 78, which is preferably formed from material such as foam rubber, has a foot print that is substantially similar to that of the apparatus housing 28. The primary function of the resilient pad 78 is to create friction between the! automobile roof 14 and apparatus housing 28. The resilient pad 78 also protects the surface of the automobile roof 14 and acts as a buffer to provide compensation for the differences in curvature between the roofs of different automobiles.

Figure 7:
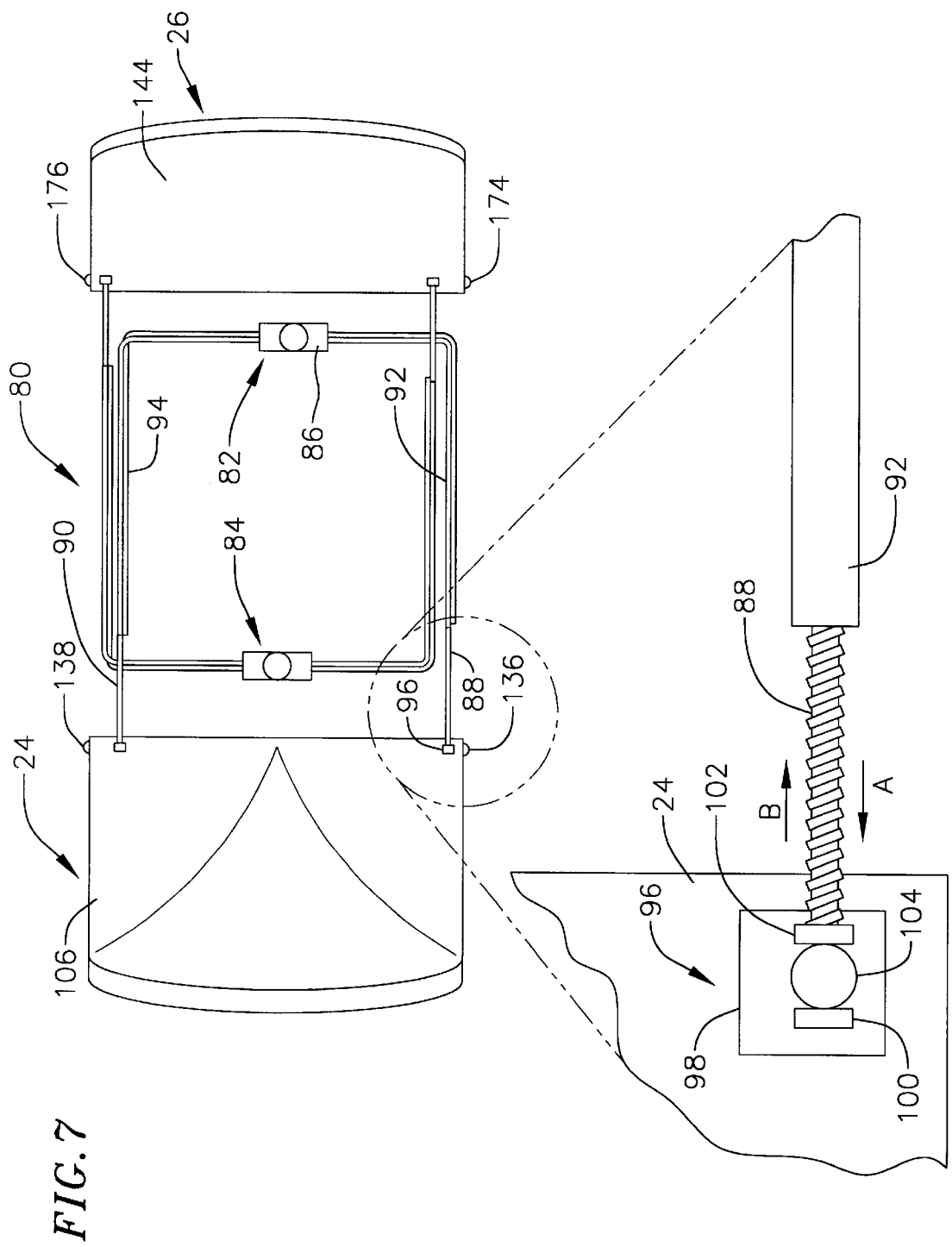
FIG. 7 is a plan view of a canopy actuation system in accordance with a preferred embodiment of the present invention.

Turning to the actuation of the front and rear canopies 24 and 26, an exemplary actuation system 80 is provided which drives the canopies between their respective retracted and deployed positions. As illustrated for example in FIG. 7, the exemplary actuation system 80 includes separate actuators 82 and 84 for each canopy. The actuators 82 and 84 are similar to those used in conjunction with automobile sunroofs. More specifically, the actuator 82 includes an electric motor 86, which may be either supported by or within the cross bar 48, and a pair of rotatable threaded cables 88 and 90 which are mounted in internally threaded cable housings 92 and 94. The motor 86 is connected by a 12V line to the automobile battery. The threaded cables 88 and 90 are each connected to the front canopy 24 with a connection assembly 96. Each connection assembly 96 includes a base plate 98, a push plate 100, a U-shaped pull bracket 102 and a ball 104 secured to the end of the cable. Preferably, the ball 104 is screwed onto the end of the cable. Actuator 84 is identical to actuator 82, may be supported by or within cross bar 58, and is connected to the rear canopy 26 through the use of connection assemblies identical to connection assembly 96.

The actuator 82 operates in the following manner. Through the use of a suitable mechanical linkage, such as a threaded member at the end of the motor rotor that engages each of the threaded cables 88 and 90, actuation of the motor 86 will cause the cables to rotate within the internally threaded cable housings 92 and 94. When the motor is in "deploy" mode, such rotation will cause the cables 88 and 90 to advance out of the cable housings 92 and 94 in the direction represented by arrow A, thereby causing the ball 104 to push against the push plate 100 and push the front canopy 24 toward its deployed position. Alternatively, when the motor has been reversed into the "retract" mode, rotation of the cables 88 and 90 will cause the cables to retract into the cable housings 92 and 94 in the direction represented by arrow B, thereby causing the ball 104 to pull against the pull bracket 102 and pull the front canopy 24 toward its retracted position. The actuator 84 operates in the same manner to drive the rear canopy 26 between its retracted and deployed positions.

Turning to the construction of the exemplary front canopy 24, and referring first to FIGS. 1–3, the front canopy 24 includes a main canopy member 106 and a pair of pivoting side canopy members 108 and 110. The top surfaces of the side canopy members 108 and 110 include pivot connectors 112 and 114 that are connected to the main canopy member 106 at points 116 and 118. The top surfaces also include followers 120 and 122 that ride in tracks 124 and 126 on the bottom surface of the main canopy member 106 as the side canopy members 108 and 110 pivot inwardly and outwardly. The followers 120 and 122 may include rollers (as shown) that ride in the tracks 124 and 126, or may simply include sliding surfaces that slide with the tracks.

As illustrated for example in FIGS. 3, 5 and 8–10, the bottom surfaces of the side canopy members 108 and 110 include curved tracks 128 and 130. A pair of fixed followers 132 and 134 are provided on the apparatus housing cross bar 48. The fixed followers 132 and 134 ride in the curved tracks 128 and 130. Because the respective positions of the followers 132 and 134 are fixed and the tracks 128 and 130 are curved, the side canopy members 108 and 110 will be urged outwardly as; the front canopy 24 is deployed and will be drawn inwardly as the front canopy is retracted.

The exemplary front canopy 24 also includes a pair of guide tabs 136 and 138 that ride in slots 140 and 142 on the front housing member 36. The exemplary guide and slot arrangement, which is best illustrated in FIGS. 3 and 6, secures the front canopy 24 to the apparatus housing 28.

In the preferred embodiment, the configuration of the exemplary rear canopy 26 is substantially similar to that of the exemplary front canopy 24. As shown by way of example in FIGS. 1–3, the rear canopy 26 includes a main canopy member 144 and a pair of pivoting side canopy members 146 and 148. The top surfaces of the side canopy members 146 and 148 include pivot connectors 150 and 152 that are connected to the main canopy member 144 at points 154 and 156. The top surfaces also include followers 158 and 160 (160 not visible) that ride in tracks 162 and 164 on the bottom surface of the main canopy member 144 as the side members 146 and 148 pivot inwardly and outwardly. The followers 158 and 160 may include rollers (as shown) that ride in the tracks 162 and 164, or may simply include sliding surfaces that slide with the tracks.

Turning to FIGS. 3, 5 and 8–10, the bottom surfaces of the exemplary side canopy members 146 and 148 include curved tracks 166 and 168. A pair of fixed followers 170 and 172 are provided on the apparatus housing cross bar 58. The followers 170 and 172 ride in the curved tracks 166 and 168. As explained above, this arrangement will cause the side canopy members 146 and 148 to be urged outwardly as the rear canopy 26 is deployed and will be drawn inwardly as the rear canopy is retracted. Like the front canopy 24, the exemplary rear canopy 26 includes a pair of guide tabs 174 and 176 that ride in slots 178 and 180 on the rear housing member 38. Corresponding slots 179 and 181 are provided on the front housing member 36 to accommodate the guide tabs 174 and 176.

Figure 11:
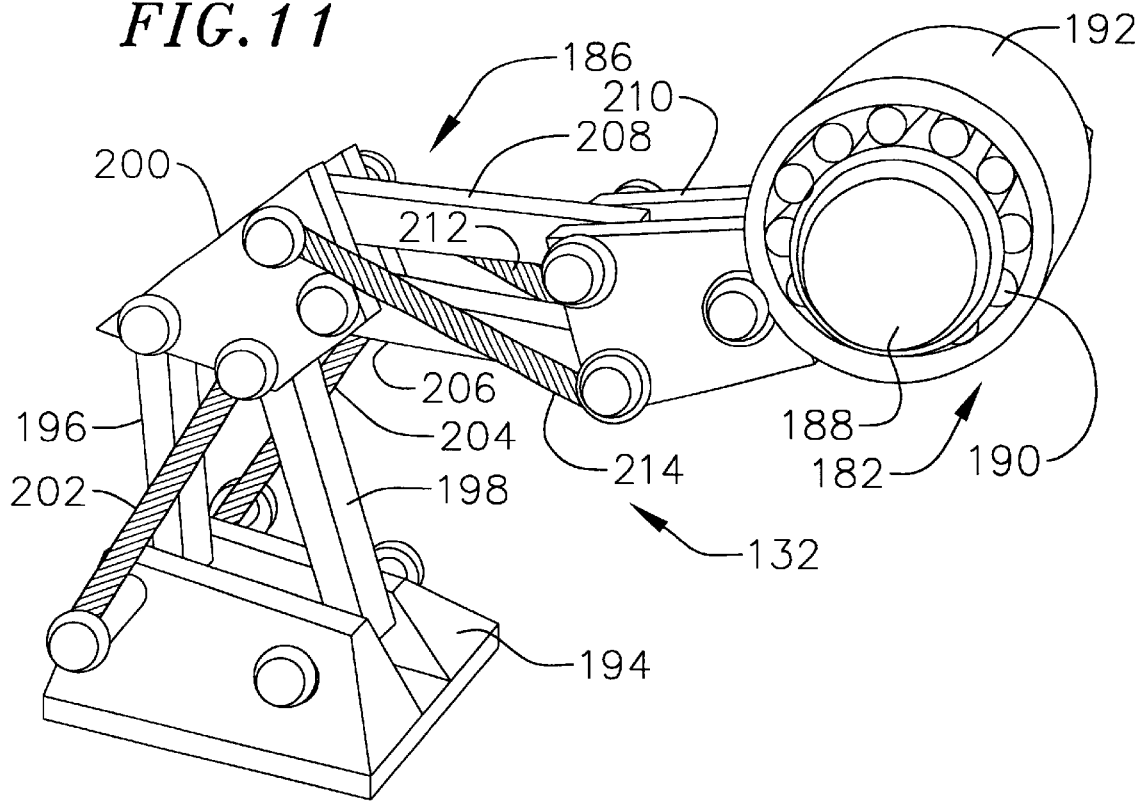
FIG. 11 is a perspective view of a fixed follower in accordance with a preferred embodiment of the present invention in an extended orientation.
Figure 12:
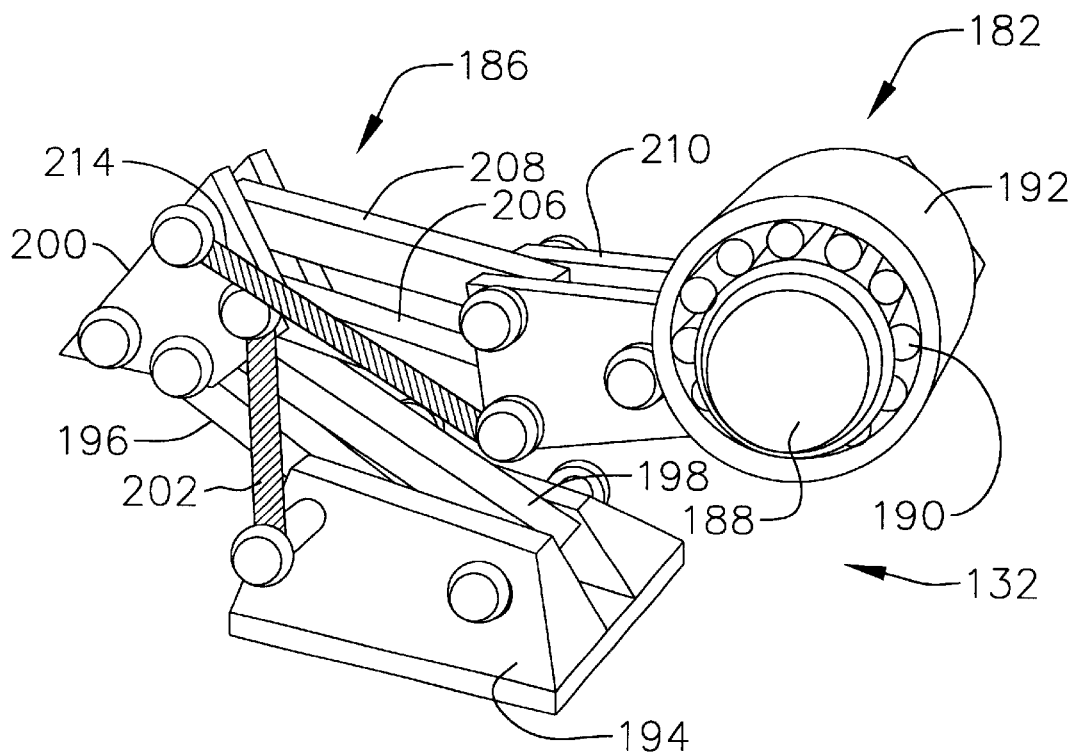
FIG. 12 is a perspective view of the fixed follower illustrated in FIG. 11 in a compressed orientation.

In the exemplary embodiment, the curved tracks 128, 130, 166 and 168 are substantially C-shaped in cross-section, as is illustrated in FIGS. 5 and 6. The fixed followers 132, 134, 170 and 172 includes rollers, such as the rollers 182 and 184 illustrated in FIG. 5, that are securely held within the curved tracks. One example of a fixed follower with a roller that may be incorporated into the present invention is illustrated in FIGS. 11 and 12. More specifically, the fixed follower 132 includes the aforementioned roller 182 and a self-adjusting roller mounting assembly 186. The exemplary roller 182 consists of a fixed inner member 188, bearings 190 and a rotatable outer member 192. The exemplary roller mounting assembly 186, which operates much like a conventional desk lamp, consists a base 194, a first pair of arms 196 and 198 that are pivotably connected to the base and to a first connecting member 200, a first pair of tension members 202 and 204 (such as springs) connected to the base and to the first connecting member, a second pair of arms 206 and 208 pivotably connected to the first connecting member and to a second connecting member 210, and a second pair of tension members 212 and 214 connected to the first and second connecting members. The arms, tension members and connecting members allow the roller mounting assembly 186 to move between the positions illustrated in FIGS. 11 and 12 during assembly and operation. Of course, other track and follower arrangements may be used. For example, the rollers can be replaced with simple sliders, and a non-adjusting mounting assembly can be substituted for the self-adjusting mounting assembly.

As illustrated for example in FIGS. 1 and 2, the front and rear canopies 24 and 26 are substantially horizontal (or parallel to the apparatus housing 28) when retracted and are angled downwardly when fully deployed. In the preferred embodiment, the reorientation of the canopies is accomplished as a result of the configuration of the tracks curved tracks 128, 130, 166 and 168. Referring to FIGS. 8–10, curved track 128, which is representative of tracks 130, 166 and 168, includes a generally planar (when viewed from the side) forward end 216 and a downwardly curved rearward end 218. Once the downwardly curved rearward end 218 reaches the fixed follower 132 as the front canopy 24 (and side members 108 and 110) approaches the fully deployed position, the downward curvature of the rearward end 218 will cause the canopy to pivot downwardly about the fixed follower. Similarly, when the front canopy 24 is beginning to be to be retracted from the fully deployed position, the downward curvature of the rearward end 218 will cause the canopy to pivot upwardly.

The exemplary front canopy 24 also includes a raised portion 220 that acts as a snow plow when the canopy is retracted, as illustrated for example in FIGS. 1–3. More specifically, snow that comes to rest on the front canopy 24 when it is deployed will be pushed off to the side as the canopy is retracted. The rear canopy 26 may be provided with a similar raised portion if desired.

As shown by way of example in FIGS. 2 and 3, the apparatus housing 28 may be provided with a cover 222. The cover 222 protects the components within the apparatus housing 28 from rain and snow.

With respect to materials, the various components of the windshield covering apparatus are preferably formed from aluminum or steel. However, thermoplastics and other materials commonly used in automobile manufacture may also be employed.

Another preferred embodiment of the present invention, which is generally represented by reference numeral 224, is illustrated in FIGS. 13 and 14. But for those aspects discussed here, the apparatus 224 for covering automobile windshields is substantially identical to the apparatus 10 illustrated in FIGS. 1–12. For example, the apparatus 224 includes a housing 226, a front canopy 228 consisting of a main canopy member 230 and a pair of pivotable side canopy members 232 and 234, and a rear canopy 236 with main and pivotable side canopy members. The apparatus also includes an actuation system similar to that illustrated in FIG. 7.

The primary difference between the exemplary apparatus 10 illustrated in FIGS. 1–12 and the exemplary apparatus 224 is the curvature of the housing and canopies. Specifically, in the exemplary apparatus 10, the canopies 24 and 26 are generally planar (i.e. linear when viewed from the side) and the tracks 128, 130, 166 and 168 include downwardly extending curved rear portions 218 that cause the canopies to pivot downwardly to positions adjacent the windshields when being deployed. [See the discussion above with reference to FIGS. 8–10.] In the exemplary apparatus 224, on the other hand, the housing 226 and canopies 228 and 236 are themselves curved, as are the slots in the housing members in which the canopy guide tabs ride. [A slot and guide tab arrangement is discussed above with reference to FIGS. 3, 5 and 6.] Thus, although the pivotable side members in the canopies 228 and 236 still include curved tracks which ride over fixed followers to cause inward and outward pivoting, the downwardly extending curved rear portion is not needed. The curvature of the canopies 228 and 236, as well as that of the guide slots in the housing 226, results in the canopies following the path of travel represented by arrows C and D in FIG. 14.

One aspect of the exemplary embodiment illustrated in FIGS. 13 and 14 that should be noted is relationship between the curvature of the front and rear canopies 228 and 236 and the curvature housing 228 and guide slots therein. Specifically, the canopies 228 and 236, housing 228 and housing guide slots preferably have the same radius of curvature, which is represented in dashed lines in FIG. 14.

There are a number of other convenience and safety related features associated with both of the aforementioned embodiments. For example, the actuators 82 and 84 are preferably controlled with a remote control device (not shown) similar to those used to control automobile alarm systems. The exemplary remote control for the windshield covering apparatus includes a deploy button, a retract button, and a button that controls the lock 72. As such remote control devices and associated devices such as lock actuators are well known, they will not be discussed in detail here. Additionally, power control circuitry may be provided that cuts power to the actuator motors when the automobile ignition system is actuated by turning the key, thereby preventing any accidental deployment of the canopies while driving.

Figure 15:
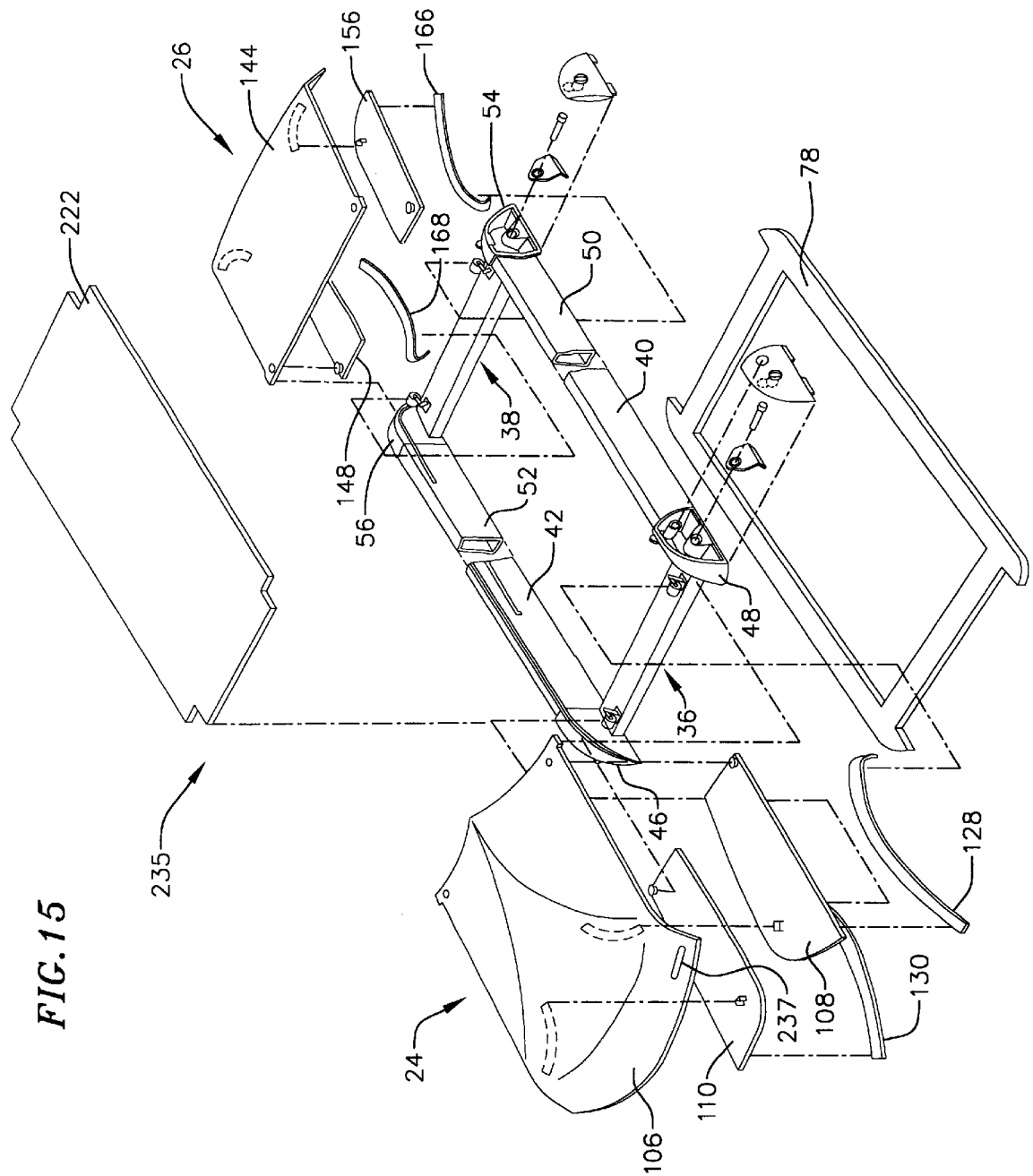
FIG. 15 is an exploded view of an apparatus for covering automobile windshields in accordance with yet another preferred embodiment of the present invention.

In accordance with another preferred embodiment, and as illustrated for example in FIG. 15, an apparatus 235 for covering automobile windshields includes the same components as the preferred embodiment illustrated in FIGS. 1–12 with the exception of the actuation system. Instead, the canopies in the apparatus 235 include handles 237 which the driver can use to manually deploy and retract the canopies. Such handles may also be incorporated into the other embodiments disclosed herein for use in the event of power loss or actuator failure. There, the balls 104 may be unscrewed from the associated cables to allow the canopies to be manually deployed and retracted.

Figure 16:
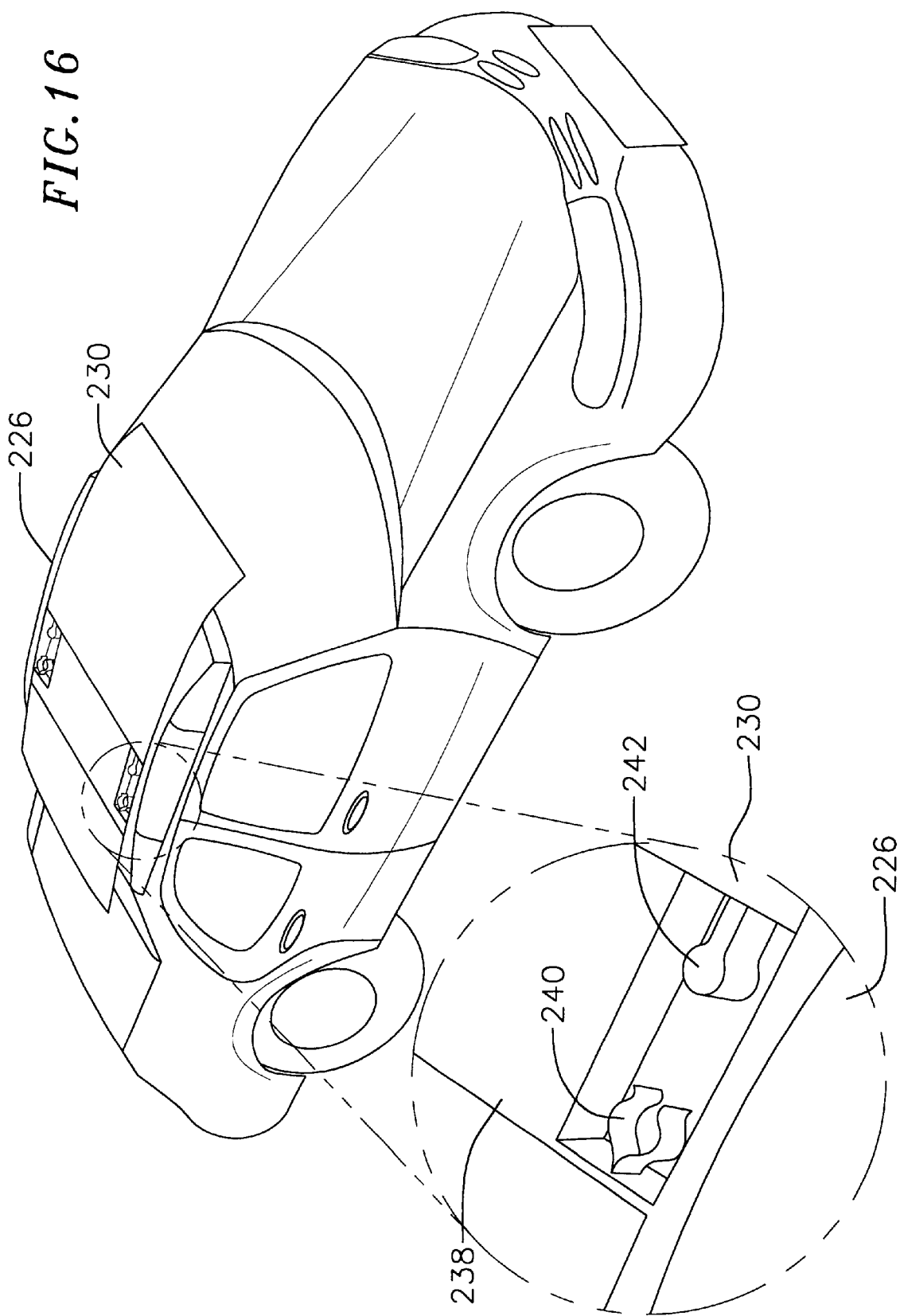
FIG. 16 is a perspective view of an automobile and an apparatus for covering automobile windshields in accordance with still another preferred embodiment of the present invention in a partially deployed state.

Another feature that may be incorporated into any of the aforementioned embodiments of the present invention, as well as other embodiments, is the canopy holder illustrated in FIG. 16 that helps prevent the canopy from rattling while the automobile is in use. Here, the apparatus housing 226 includes a support structure 238 on which a resilient clamp 240 is mounted. The canopy 230 includes a ball-shaped element 242 that is received by the resilient clamp 240, thereby holding the canopy till. The actuator is, of course, sufficiently powerful to the drive the ball-shaped element 242 into the resilient clamp 240 during canopy retraction and to pull it therefrom during canopy deployment.

The present invention may also be adapted for use with automobiles having sunroofs. Turning to FIGS. 17–19, exemplary front canopy 244 includes an opening 246 and a slid able door 248 that is located in a hollow area between the top and bottom walls 250 and 252 of the main canopy member 254. The lateral sides of the door are provided with sliders that ride within tracks (both not shown) located in the hollow area of the main canopy member 254. A handle 256 is also provided. The canopy 244 also includes a pair of pivotable side canopy members 258 and 260 that have cutout areas 262 and 264 and tracks 266 and 268. The cutout areas 262 and 264 prevent the side canopy members 258 and 260 from blocking the lateral sides of the automobile sunroof opening when the canopy 244 is in the retracted position with the door 248 open, as illustrated in FIG. 18. A similar sliding door and opening arrangement is provided in the housing cover 222.

The present invention may also be adapted to cover the side windshields of automobiles by simply adding side canopies and actuators therefor and making minor modifications to the apparatus housing. For example, the height of the housing could be increased to accommodate the additional canopies and slots that extend transverse to the longitudinal axis of the automobile could be provided.

Figure 20:
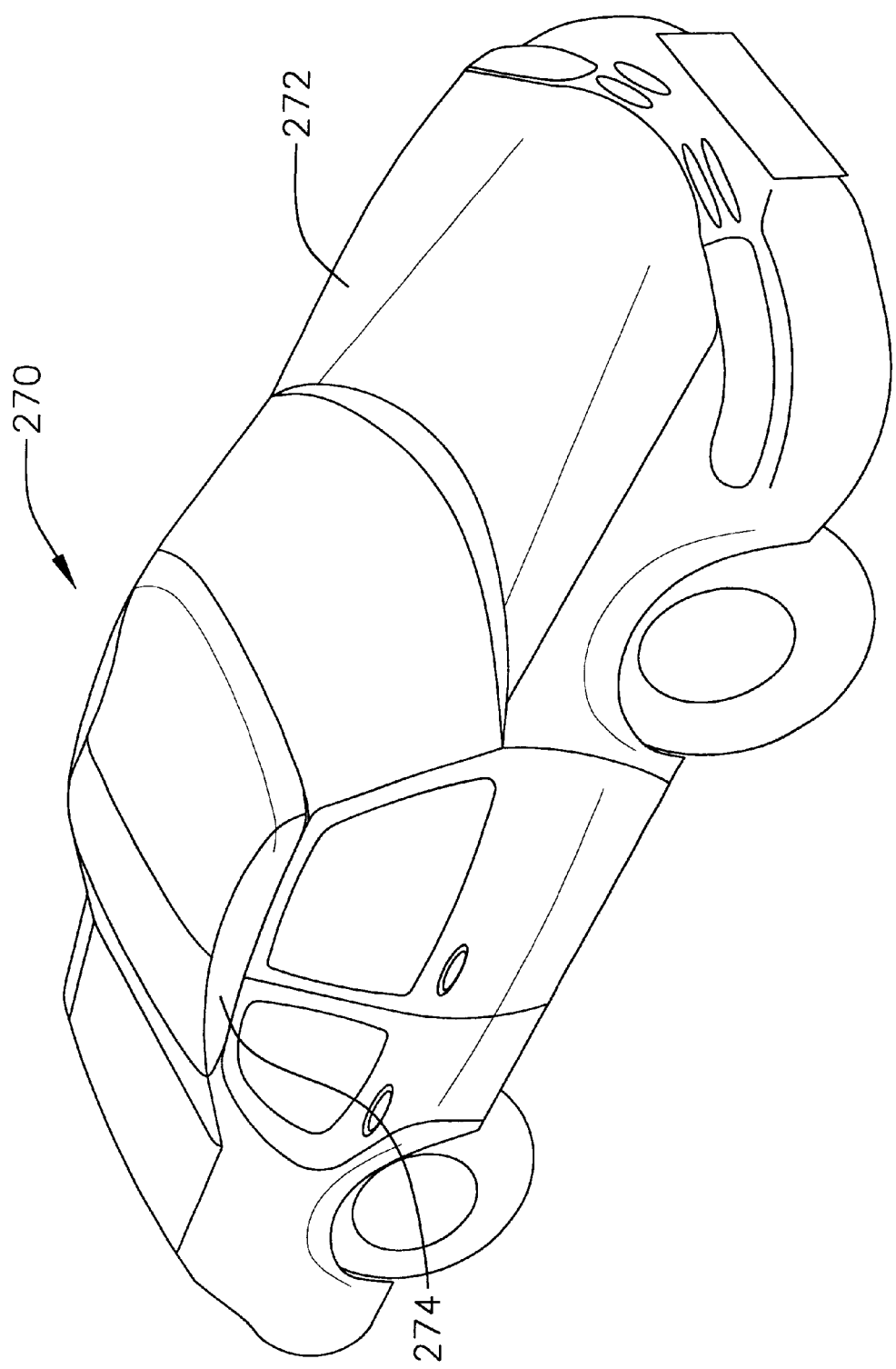
FIG. 20 is a perspective view of an automobile including an apparatus for covering automobile windshields in accordance with still another preferred embodiment of the present invention in a retracted state.

In accordance with another preferred embodiment of the present invention, an exemplary windshield covering apparatus 270, which is otherwise identical to the covering apparatus described above, is designed to be an integral component of an automobile 272, as is illustrated in FIG. 20. Thus, there is no need for clamps 32 and 341. The apparatus housing 274 may be manufactured as a separate component that is secured to the roof of the car during manufacturing or simply be formed as part of the automobile body. In either case, the contour of the apparatus housing should match that automobile, thereby making the windshield covering apparatus 270 almost unnoticeable when in the retracted state illustrated in FIG. 20.

Turning to FIGS. 21–24, in accordance with another preferred embodiment of the present invention, an exemplary apparatus 280 for use with an automobile having a side windshield is shown. The apparatus 280, which includes a screen member 282 and an actuator 284, is located within a portion of the automobile. In the preferred embodiment, the apparatus is located within a side door 286. The "in-door" screen member 282 is manipulated in position by the actuator 284 between an extended position where the screen member extends from the side door 286 and a retracted position where the screen member is positioned within the side door.

Figure 21:
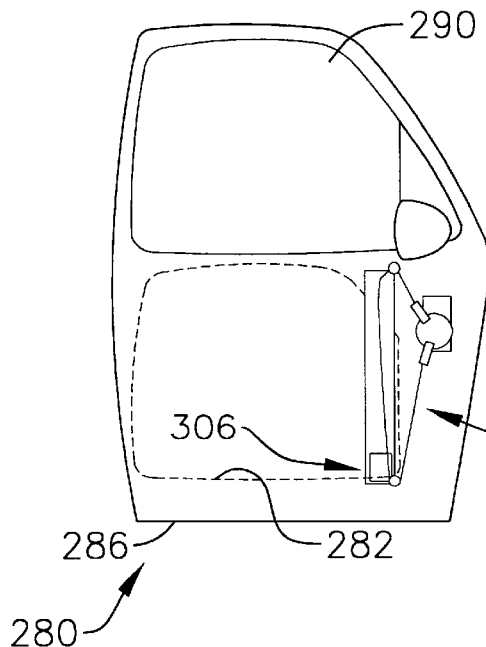
FIG. 21 is a side view of an automobile door including an apparatus for covering a side windshield of the automobile in accordance with yet another preferred embodiment of the present invention in a retracted state, the apparatus including a screen member shown in dashed lines and an actuator mechanism.
Figure 22:
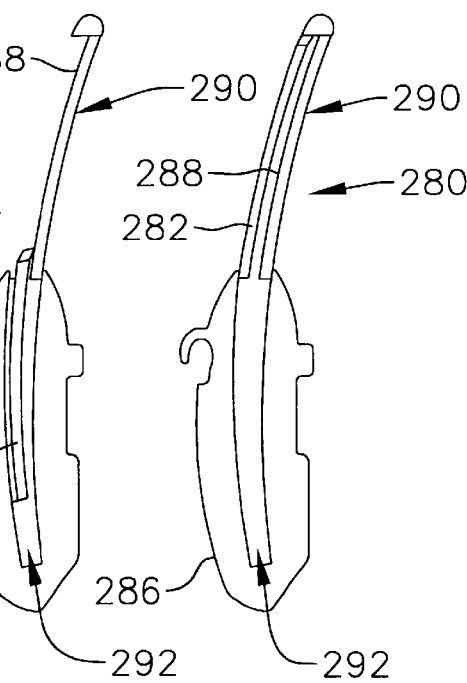
FIG. 22 is a cross-sectional side view of the automobile door and apparatus illustrated in FIG. 21.
Figure 23:
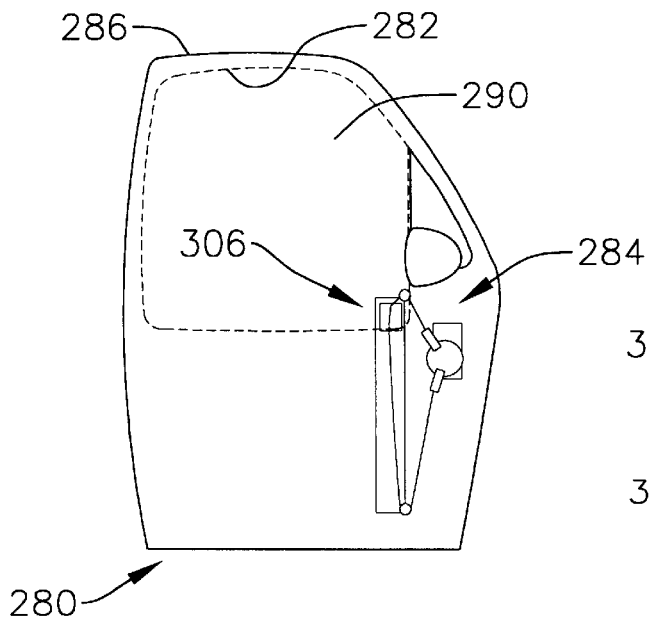
FIG. 23 is a side view of the automobile door and apparatus illustrated in FIG. 21 in extended position.

The screen member 282 is preferably sized to cover substantially all of an outer surface 288 (FIG. 22) of windshield 290 and to be fitted within a housing 292 defined by the automobile door 286. The housing 292 can be alternatively defined by a portion of the automobile other than the door 286 so long as the portion is adjacent to or sufficiently near the windshield 290. FIGS. 21 and 23 show the screen member 282 in its retracted position within the housing 292. FIGS. 22 and 24 how the screen member 282 in its extended position covering substantially the entire outer surface 288 of the windshield 290.

Figure 25:
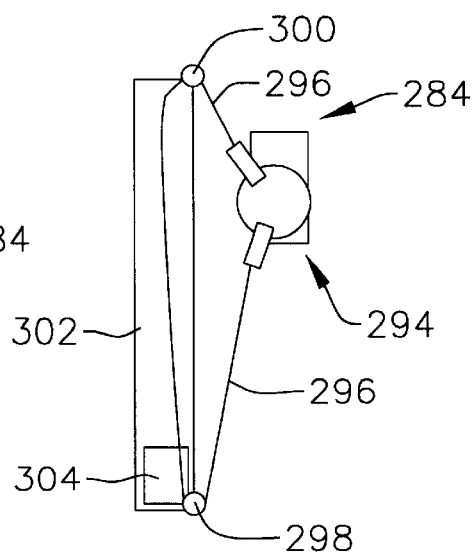
FIG. 25 is an enlarged side view of the actuator mechanism illustrated in FIG. 21.

Turning to FIG. 25, the actuator mechanism 284 includes a motor 294, a cable 296, pulleys 298, 300, a track 302 and a screen connect 304 configured as shown. The actuator mechanism 284 can be, for example, a conventional electric windshield drive mechanism. A lower portion 306 (FIGS. 21 and 23) of the screen member 282 is mechanically connected to the screen connect 304 and is raised and lowered under control of the motor 294.

With regard to materials, the screen member 282 preferably comprises an opaque material such as aluminum (e.g., 2 mil in thickness) or plastic. Alternatively, the screen member 282 comprises a translucent material such as a tinted glass or plastic.

In another preferred embodiment, the apparatus 280 shown in FIGS. 21–25 is used in conjunction with one of the apparatuses shown in FIGS. 1–20 to protect the front, rear and side windshields of the automobile. Furthermore, it should be understood that the scope of the present invention is not limited to a screen member 282 formed as a single piece. Rather, a plurality of screen members can be positioned within the housing 292, each being extended or retracted as desired via an appropriate arrangement of actuators.

Although the present invention has been described in terms of the preferred embodiment above, numerous modifications and/or additions to the above-described preferred embodiments would be readily apparent to one skilled in the art. It is intended that the scope of the present invention extends to all such modifications and/or additions.

What is claimed is:

1. A device for use with an automobile having a windshield and a body defining an automobile contour, the device comprising:

a device housing formed as an integral portion of the automobile body and defining a portion of the automobile contour; and a windshield cover associated with the device housing and sized to substantially cover the windshield of the automobile, the windshield cover being slidable between a retracted position substantially coextensive with the device housing and an extended position substantially aligned with the windshield;

the device housing and windshield cover defining respective shapes and sizes such that at least one of the housing and windshield cover forms an automobile roof that defines another portion of the automobile contour and renders the device housing substantially undistinguishable from the remainder of the automobile contour when the cover is in the retracted position.

2. A device as claimed in claim 1, wherein the automobile includes front and rear windshields and the windshield cover comprises front and rear windshield covers.

3. A device as claimed in claim 1, further comprising:
an actuator, associated with the device housing and mechanically connected to the windshield cover, adapted to move the windshield cover between the retracted and extended positions.

4. A device as claimed in claim 3, wherein the actuator comprises a motor and rotating cable arrangement.

5. A device as claimed in claim 1, wherein the windshield cover is movable between the retracted position, a pivot position, and the extended position.

6. A device as claimed in claim 1, wherein the windshield cover comprises a main member defining first and second lateral sides, a forward end and a rearward end, a first side member pivotably connected to the main member at an area substantially adjacent to the rearward end and first lateral side of the main member, and a second side member pivotably connected to the main member at an area substantially adjacent to the rearward end and second lateral side of the main member.

7. A device as claimed in claim 6, wherein the first and second side members pivot outwardly as the windshield cover moves from the retracted position to the extended position.

8. A device as claimed in claim 6, further comprising:
a pivot mechanism adapted to pivot the first and second side members relative to the main member as the windshield cover moves relative to the device housing.

9. A device as claimed in claim 1, further comprising:
a handle associated with the windshield cover.

10. An automobile, comprising:
a windshield;
an automobile body defining an automobile contour and including a windshield cover housing formed as an integral portion of the automobile body, the windshield cover housing defining a housing contour which forms part of the automobile contour to render the windshield cover housing substantially undistinguishable from the remainder of the automobile contour; and
a windshield cover associated with the windshield cover housing and sized to substantially cover the windshield of the automobile, the windshield cover being slidable between a retracted position substantially coextensive with the windshield cover housing and an extended position substantially aligned with the windshield.

11. An automobile as claimed in claim 10, wherein the automobile includes front and rear windshields and the windshield cover comprises front and rear windshield covers.

12. An automobile as claimed in claim 10, further comprising:
an actuator, associated with the windshield cover housing and mechanically connected to the windshield cover, adapted to move the windshield cover between the retracted and extended positions.

13. An automobile as claimed in claim 12, wherein the actuator comprises a motor and rotating cable arrangement.

14. An automobile as claimed in claim 10, wherein the windshield cover is movable between the retracted position, a pivot position, and the extended position.

15. An automobile as claimed in claim 10, wherein the windshield cover comprises a main member defining first and second lateral sides, a forward end and a rearward end, a first side member pivotably connected to the main member at an area substantially adjacent to the rearward end and first lateral side of the main member, and a second side member pivotably connected to the main member at an area substantially adjacent to the rearward end and second lateral side of the main member.

16. An automobile as claimed in claim 15, wherein the first and second side members pivot outwardly as the windshield cover moves from the retracted position to the extended position.

17. An automobile as claimed in claim 15, further comprising:
a pivot mechanism adapted to pivot the first and second side members relative to the main member as the windshield cover moves relative to the windshield cover housing.

18. An automobile as claimed in claim 10, further comprising:
a handle associated with the windshield cover.

* * * * *